(12) United States Patent
Fujita et al.

(10) Patent No.: US 8,052,919 B2
(45) Date of Patent: Nov. 8, 2011

(54) HIGH FREQUENCY INDUCTION HEATING TREATMENT EQUIPMENT AND METHOD AND INDUCTION HEATED AND THUS TREATED PRODUCT

(75) Inventors: Takumi Fujita, Kuwana (JP); Nobuyuki Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 734 days.

(21) Appl. No.: 11/662,713

(22) PCT Filed: Sep. 8, 2005

(86) PCT No.: PCT/JP2005/016500
§ 371 (c)(1),
(2), (4) Date: Mar. 14, 2007

(87) PCT Pub. No.: WO2006/030686
PCT Pub. Date: Mar. 23, 2006

(65) Prior Publication Data
US 2008/0073003 A1    Mar. 27, 2008

(30) Foreign Application Priority Data

| Sep. 14, 2004 | (JP) | 2004-267180 |
| Oct. 29, 2004 | (JP) | 2004-316015 |
| Oct. 29, 2004 | (JP) | 2004-316020 |
| Oct. 29, 2004 | (JP) | 2004-316023 |
| Jun. 10, 2005 | (JP) | 2005-170778 |
| Jun. 10, 2005 | (JP) | 2005-171376 |

(51) Int. Cl.
*C21D 1/10* (2006.01)
*C21D 11/00* (2006.01)
*H05B 6/06* (2006.01)

(52) U.S. Cl. ............ 266/96; 266/87; 266/129; 219/663

(58) Field of Classification Search .................. 148/500, 148/508, 511, 567, 570, 571, 574, 575; 266/78, 266/81, 87, 129, 96; 219/642, 644, 657, 219/650, 663, 667
See application file for complete search history.

(56) References Cited

U.S. PATENT DOCUMENTS 7,015,439 B1 * 3/2006 Thomas et al. ............... 219/667
(Continued)

FOREIGN PATENT DOCUMENTS

JP    50-144154    * 11/1975
(Continued)

OTHER PUBLICATIONS

N. Iguchi, et al., "On the Non-equilibrium Fe-Fe$_3$C Phase Diagram in Super-Rapid Heating," Journal of the Japan Institute of Metals, vol. 39, No. 3, Mar. 1975, p. 255-260.

(Continued)

*Primary Examiner* — George Wyszomierski
*Assistant Examiner* — Mark L Shevin
(74) *Attorney, Agent, or Firm* — McDermott Will & Emery LLP (57) ABSTRACT

To provide a heat treatment providing a product with quality as desired, high frequency induction heating treatment equipment capable of temperature control to provide such heat treatment includes temperature controlling means for adjusting in temperature an object to be treated, and quenching means for determining when the object heated should be cooled. The temperature controlling means includes heating means, temperature measuring means involved in temperature control, and temperature adjusting means. The quenching means includes temperature measuring means involved in quenching, and heat treatment adjusting means.

2 Claims, 7 Drawing Sheets

U.S. PATENT DOCUMENTS

2001/0004983 A1 6/2001 Wiezbowski
2006/0289495 A1* 12/2006 Thomas et al. ............... 219/677

FOREIGN PATENT DOCUMENTS

| JP | 61-130418 A | 6/1986 |
| JP | 61-221326 | 10/1986 |
| JP | 62-063618 | 3/1987 |
| JP | 07-179952 | 7/1995 |
| JP | 2005-325408 | 11/2005 |
| JP | 2005-325409 | 11/2005 |

OTHER PUBLICATIONS

Japanese Office Action, with English translation, issued in Japanese Patent Application No. 2005-171376, mailed Mar. 17, 2009.

European Search Report issued in European Patent Application No. 05782273.6-1215/1808499 PCT/JP2005016500, dated Sep. 16, 2009.

\* cited by examiner

HIGH FREQUENCY INDUCTION HEATING TREATMENT EQUIPMENT AND METHOD AND INDUCTION HEATED AND THUS TREATED PRODUCT

RELATED APPLICATIONS

This application is the U.S. National Phase under 35 U.S.C. §371 of International Application No. PCT/JP2005/016500, filed on Sep. 8, 2005, which in turn claims the benefit of Japanese Application No. 2004-267180, filed on Sep. 14, 2004, Japanese Application No. 2004-316020, filed on Oct. 29, 2004, Japanese Application No. 2004-316015, filed on Oct. 29, 2004, Japanese Application No. 2004-316023, filed on Oct. 29, 2004, Japanese Application No. 2005-170778, filed on Jun. 10, 2005, and Japanese Application No. 2005-171376, filed on Jun. 10, 2005, the disclosures of which Applications are incorporated by reference herein.

TECHNICAL FIELD

The present invention relates generally to high frequency induction heating treatment equipment and methods and induction heated thus treated products, and particularly to such equipment and methods that employ induction heating to heat, and thus quench and thus harden an object to be treated, and induction heated thus treated products induction heated and thus quenched and thus hardened.

BACKGROUND ART

High frequency induction heating equipment is more advantageous than a generally used atmospheric furnace in that the former allows operation to be done in a clean environment and a small lot of products to be processed in a short period of time efficiently. Generally when steel is induction quenched using an induction coil, power control is adopted to control a condition of a heat treatment of an object such that the power input to the coil and time are used as parameters. The steel is quenched under a variety of heat treatment conditions and the quenched object is confirmed in quality to empirically set an appropriate heat treatment condition. In this case whenever the object is changed the current heat treatment condition(s) must be reconsidered. Determining a heat treatment condition is thus cumbersome. This is attributed to the fact that it is difficult to adopt temperature control to control a condition of a heat treatment of an object by employing temperature and time as parameters.

When controlling a quenched object in quality, metallographically in particular, is considered, it is preferable that the object is quenched with temperature control. In induction quenching, however, it is technologically difficult to measure and rapidly control temperature. As such, quenching with temperature control is currently not adopted. It is difficult to measure temperature in an induction heating treatment because in contrast to an object heated in an atmosphere and thus treated, an object to be treated is directly heated and accordingly the measurement of temperature must be obtained directly from the object. Furthermore, high frequency induction heating equipment is often provided with a drive mechanism to drive an object to heat the object uniformly. This renders it difficult to lay out a contact type thermometer for installation and hence measure temperature.

This may be addressed for example by employing a radiation thermometer or a similar non contact type thermometer to facilitate measuring temperature. However, conventional radiation thermometers respond slowly and are thus unsuitable for measuring the temperature of metal. Thus there has not been a radiation thermometer suitable for temperature control in induction hardening. Recently, there have been provided radiation thermometers outputting signals faster and settable in emissivity to measure temperature with higher precision. This may find a possibility of employing a radiation thermometer in induction hardening to rapidly control temperature.

If induction quenching can be done with temperature control, induction heating, which basically, partially heats an object to be treated, does not provide the object with a uniform profile in temperature. As a result the object may have some quenched portion(s) different in quality. This is problematic when induction quenching is applied to a through hardening process. In particular, if the object to be treated is large in thickness, it would have a significantly uneven profile in temperature and thus be prone to have some portion(s) different in quality. If the object is not heated uniformly, the object has a portion sufficiently heated and hence satisfying a level of quality as desired as a product, and a portion insufficiently heated and hence failing to satisfy the level of quality as desired as the product.

Such problem may be resolved by heating the object for a sufficient period of time to utilize heat conduction to allow the object to have internal, uniform temperature. The problem may also be resolved by employing a high frequency power supply of a relatively small frequency to cause a magnetic flux to enter the object deeply to heat the object uniformly. Theses approaches, however, have a common issue to be addressed, i.e., that how the sufficient period of time for heating the object should be determined.

DISCLOSURE OF THE INVENTION

Problems to be Solved by the Invention

As described above, it is difficult to perform induction quenching with temperature control. If induction quenching with temperature control is applied to through hardening, it is necessary to contrive a heat treatment method providing a heat treatment allowing a product to have a desired quality. Accordingly the present invention contemplates an induction heating treatment equipment and method capable of temperature control to provide a heat treatment allowing a product to have a desired quality. The present invention also contemplates an induction heated and thus treated product having the desired quality.

Means for Solving the Problems

The present induction heating treatment equipment applies induction heating to heat an object to be treated, and thus quench and thus harden the object. The present induction heating treatment equipment includes temperature controlling means for adjusting the object in temperature, and quenching means for determining when the object heated should be cooled.

In the above high frequency induction heating treatment equipment preferably the temperature controlling means includes heating means, temperature measuring means involved in temperature control, and temperature adjusting means. The heating means has a function to heat the object through induction heating. The temperature measuring means involved in temperature control has a function to measure the temperature of a portion of the object that is heated by the heating means. The temperature adjusting means is connected to the temperature measuring means involved in temperature control and has a function to output a temperature control signal to the heating means, as based on information of temperature received from the temperature measuring means involved in temperature control. The quenching means includes temperature measuring means involved in quenching, and heat treatment adjusting means. The temperature measuring means involved in quenching has a function to measure the temperature of a portion located away from the portion of the object that is heated by heating means. The heat treatment adjusting means is connected to the temperature measuring means involved in quenching, and has a function to adjust a heating time, as based on temperature information received from the temperature measuring means involved in quenching, and output a cooling start signal.

The present high frequency induction heating treatment method employs induction heating to heat and thus quench and harden an object to be treated. The method includes a temperature controlling step of adjusting the object in temperature, and a quench controlling step of determining when the object heated should be cooled. The temperature controlling step includes a heating step, a temperature measuring step involved in temperature control, and a temperature adjusting step. In the heating step, the object is induction heated. In the temperature measuring step involved in temperature control, the temperature of a portion of the object that is heated is measured. In the temperature adjusting step, a temperature control signal is output, as based on information of the temperature measured, to control heating the object. The quench controlling step includes a temperature measuring step involved in quenching, and a heat treatment adjusting step. In the temperature measuring step involved in quenching, the temperature of a portion located away from the portion of the object that is heated is measured. In the heat treatment adjusting step a heating time is adjusted, as based on information of the temperature measured, and a cooling start signal is output.

The present induction heated and thus treated product is obtained through a heat treatment conducted in accordance with the high frequency induction heating treatment method as described above.

Effects of the Invention

The present induction heating treatment equipment can provide desired quality to an object to be treated having any geometry. Furthermore the present induction heating treatment method can provide desired quality to an object to be treated having any geometry. In other words, the present induction heating treatment equipment and method can adopt temperature control to provide a heat treatment allowing a product to have a desired quality. Furthermore the present induction heated and thus treated product can achieve the desired quality.

DESCRIPTION OF THE REFERENCE SIGNS

1: object to be treated, 2: heating means, 3: temperature measuring means involved in temperature control, 4: temperature adjusting means, 5: temperature measuring means involved in quenching, 6: heat treatment adjusting means, 7: quenching liquid injecting means, 10: high frequency induction heating treatment method, 20: temperature controlling step, 22: heating step, 23: temperature measuring step involved in temperature control, 24: temperature adjusting step, 30: quench controlling step, 35: temperature measuring step involved in quenching, 36: heat treatment adjusting step, 37: cooling step

BEST MODES FOR CARRYING OUT THE INVENTION

First Embodiment

Figure 1:
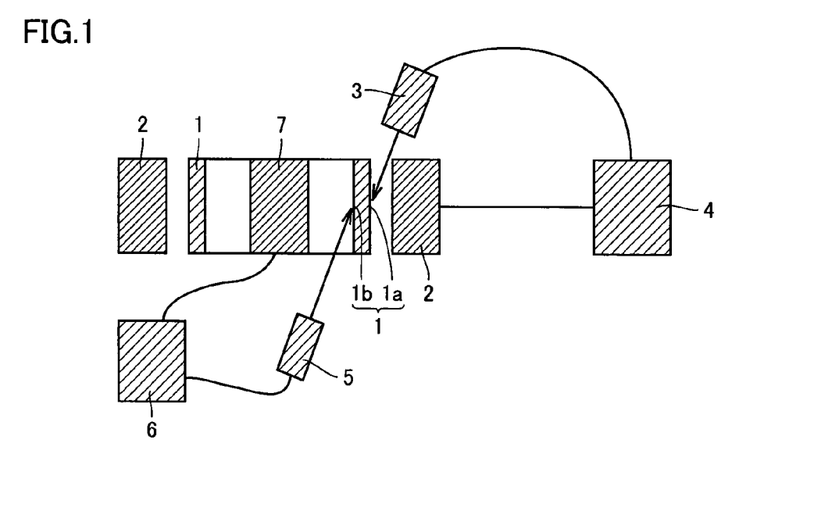
FIG. 1 is a schematic view showing a configuration of induction heating treatment equipment according to a first embodiment.

In the following, referring to the drawings, a first embodiment of the present invention will be described. Referring to FIG. 1, an induction heating treatment equipment of the first embodiment includes temperature controlling means for adjusting the temperature of an object 1 to be treated, and quenching means for determining when object 1 heated should be cooled. In the first embodiment object 1 having any geometry can be subjected to a heat treatment to produce an induction heated and thus treated product having a desired quality. Furthermore in the first embodiment the induction heating treatment equipment allows an induction coil serving as heating means to have any geometry selected as desired and a power supply to have any frequency selected as desired, and can be used for an object to be treated having any geometry.

As shown in FIG. 1, preferably the temperature controlling means typically includes heating means 2 such as a coil for heating object 1 through induction heating, temperature measuring means 3, such as a thermometer, involved in temperature control and measuring the temperature of a portion 1a of object 1 that is heated by heating means 2, and temperature adjusting means 4 connected to temperature measuring means 3 for outputting to heating means 2 a temperature control signal based on temperature information provided from temperature measuring means 3.

The quenching means preferably includes temperature measuring means 5 that is involved in quenching and measures the temperature of a portion 1b of object 1 located away from portion 1a heated by heating means 2, and heat treatment adjusting means 6 connected to temperature measuring means 5 for adjusting a heating time based on temperature information provided from temperature measuring means 5 to output a cooling start signal to quenching liquid injecting means 7 and the like.

A feature of the equipment lies in having temperature measuring means 3 involved in temperature control and measuring the temperature of portion 1a heated by heating means 2 and temperature measuring means 5 that is involved in quenching and measures the temperature of a portion 1b located away from portion 1a heated by heating means 2. In order to achieve more precise temperature control in induction heat treatment, it is desirable that temperature measuring means 3 measures the temperature of a portion where a magnetic flux enters in the largest amount and the largest elevation in temperature is observed.

Induction heating is partial heating, i.e., heats a surface layer of object 1. Accordingly, there is a temperature distribution in object 1. Accordingly, some portion after the heat treatment may have a varied quality, which poses a problem in applying induction heating to a through hardening process. In particular, the temperature unevenness is significant with object 1 large in thickness and thus the problem is likely to be invited. Accordingly, in order to also sufficiently heat a portion of low temperature to provide a desired quality, it is desirable that temperature measuring means 5 measures the temperature of a portion where the magnetic flux less enters and a small elevation in temperature is observed, that is, a portion as far from the portion the temperature of which is measured by temperature measuring means 3 as possible.

In the induction heating treatment method of the present embodiment, the shape of the induction coil and the frequency of the power supply are not limited, if the position of temperature measuring means 3 and that of temperature measuring means 5 satisfy the aforementioned condition. Furthermore, preferably, more than one temperature measuring means 5 for determining when the object should be cooled are provided to reduce the effect of temperature unevenness in object 1 and ensure quality at a plurality of portions. The type of the thermometer used as the temperature measuring means may not be a radiation thermometer or a similar, non-contact-type thermometer. It may be a contact-type thermometer such as a thermocouple if the layout of the equipment allows.

Hereinafter the induction heating treatment method of the first embodiment using the above-described induction heating treatment equipment will specifically be described, exemplarily showing an outer ring of a bearing of JIS 6206 type (JIS: Japanese Industrial Standard) made of SUJ2 as object 1.

Here, the outer ring of the SUJ2 material has a standard, as obtained when the object is tempered at 180° C., in hardness set at least HRC 58 (or HV 653) from the viewpoint of strength and in the quantity of retained austenite set at most 12 volume % from the viewpoint of dimensional stability.

Figure 2:
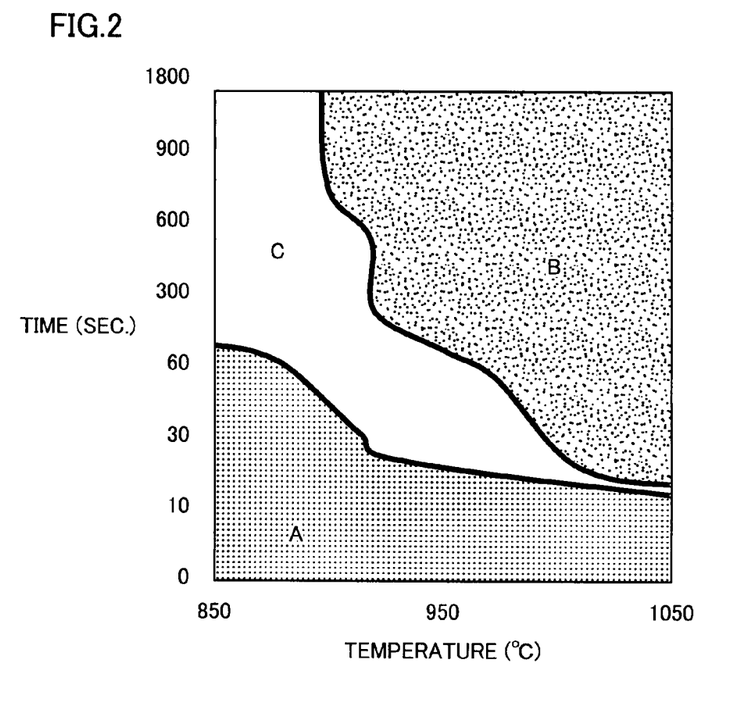
FIG. 2 is a time temperature austinitization (TTA) diagram of SUJ2 material showing a relationship between a quenching temperature and a holding time required to satisfy a standard.

Initially reference will be made to FIG. 2 to describe how a condition of a quenching temperature and a holding time that satisfy the above standard, i.e., a heating condition that should be observed when the temperature control means controls the temperature applied to heat the object. In FIG. 2, a region A represents a range that does not satisfy the above standard in hardness. A region B represents a range that does not satisfy the above standard in the quantity of retained austenite. A region C represents a range that satisfies both of the standards. The hardness standard is more likely to be satisfied as the quenching temperature and the holding time increase. On the other hand, the standard of the quantity of retained austenite is less likely to be satisfied as the quenching temperature and the holding time increase.

As is apparent from the TTA diagram of FIG. 2, heating at relatively low temperature for a long period of time facilitates to control qualities (hardness, and the quantity of retained austenite) obtained through a heat treatment and more readily satisfies the standards of the qualities (hardness, and the quantity of retained austenite) obtained through the heat treatment. For example in a treatment at a relatively high temperature of 1050° C., the holding time for satisfying the standards of the qualities obtained through the heat treatment needs at least 15 seconds, and a holding time of 17 seconds or more does not satisfy the standards. In contrast, in a treatment at 950° C., the holding time for satisfying the standards of the qualities obtained through the heat treatment is at least 20 seconds, and a holding time of up to 60 seconds can satisfy the standards. In order to exploit an advantage of induction heating treatment, i.e., that it is a quick treatment, it is desirable to conduct the process at as high a temperature as possible for as short a period of time as possible.

The heat pattern at a position the temperature of which is measured by temperature measuring means 3 can be determined by the balance between reduction in the heat treatment time and ease of control of the heat treatment. If a diagram representing a relationship between the quenching temperature and the holding time allowing the heat treatment to provide a product with satisfactory qualities, or a TTA diagram, can be prepared for various types of materials for the object to be treated, a condition can be determined according to the diagram. Hence, the induction heating treatment equipment according to the first embodiment can be used irrespective of the type(s) of the material(s) forming the object to be treated.

When a heating condition that should be observed by the temperature controlling means to control temperature applied to heat the object is determined, then, as shown in FIG. 1, the heating condition is input to temperature adjusting means 4 such as a personal computer. Temperature adjusting means 4 is connected to temperature measuring means 3 and heating means 2. Based on temperature information received from temperature measuring means 3, it can output a temperature control signal by PID (Proportional Integral Differential) control to heating means 2 to control the temperature of portion 1a the temperature of which is measured by temperature measuring means 3. At the same time, temperature measurement data from temperature measuring means 5 is taken into heat treatment adjusting means 6 such as a personal computer. Based on the heat pattern, whether the heating is sufficient is determined and when the object should be cooled is determined to adjust the time of the heat treatment. When the object should be cooled is determined by whether the heat pattern of portion 1b the temperature of which is measured by temperature measuring means 5 falls within the standards in the TTA diagram. It is noted that temperature adjusting means 4 and heat treatment adjusting means 6 can be implemented by a single personal computer.

Whether the heat pattern falls within the standards on the TTA diagram can be determined from a $D_{ep}$ value calculated by:

$$D_{ep}=2(Dt)^{1/2} \quad \text{expression (1)}$$

$$D=D_0\exp(-Q/RT) \quad \text{expression (2)}$$

wherein D represents a diffusion constant, t represents a holding time, T represents temperature, $D_0$ represents an entropy term of the diffusion constant, and Q represents activation energy.

In the present induction heating treatment equipment heat treatment adjusting means 6 can output a cooling start signal based on the $D_{ep}$ value calculated by the expressions. Before steel is quenched it has a composition containing iron having slight carbon solved therein, with a carbide distributed in the iron. In quenching, the carbon in the carbide needs to be solved into the iron. The time required to solve the carbon uniformly in the iron corresponds to carbon's diffusion length $D_{ep}$. Accordingly in the quenching the steel is cooled when the $D_{ep}$ value attains a value $D^*_{ep}$.

The portion the temperature of which is measured by temperature measuring means 5 is not limited to a single portion. From the viewpoint of quality control, it is desirable that temperature measuring means 5 measure a plurality of portions in temperature since the qualities obtained through the heat treatment at the plurality of positions can be controlled.

Figure 3:
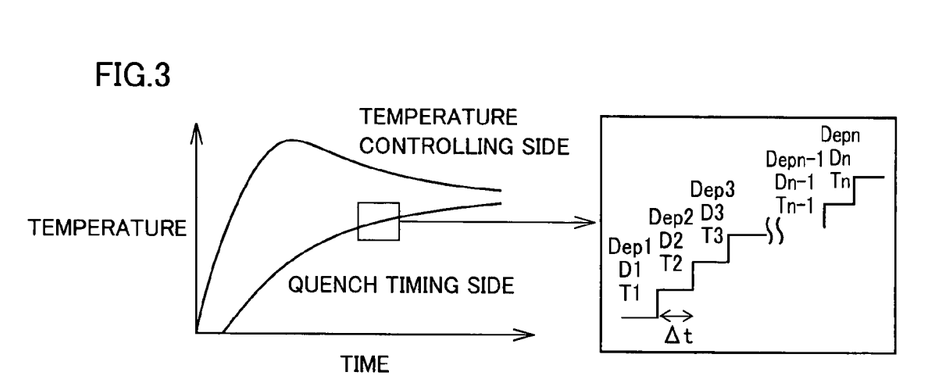
FIG. 3 is a diagram for illustrating a method of integrating a value of $D_{ep}$ from a heat pattern.

With reference to FIG. 3 a method of integrating the $D_{ep}$ value from the heat pattern will be described. If the temperature of portion 1b the temperature of which is measured, or the quench timing side, referred to determine when to cool the object changes from time to time, the value of $D_{ep}$ is preferably integrated such that $$Dep_1 = \sqrt{2D_1 \Delta t} \rightarrow Dep_2 = \sqrt{2D_2\left[\left(\frac{Dep_1}{\sqrt{2D_2}}\right)^2 + \Delta t\right]} \rightarrow Dep_n = \sqrt{2D_n\left[\left(\frac{Dep_{n-1}}{\sqrt{2D_n}}\right)^2 + \Delta t\right]}$$

as shown in FIG. 3. As object 1 is increased in temperature, portion 1b the temperature of which is measured by temperature measuring means 5 increases in temperature more slowly than portion 1a, or the temperature controlling side, the temperature of which is measured by temperature measuring means 3, since less magnetic flux enters the former than the latter. Normally, if the temperature exceeds 727° C., iron starts to be austenitized. For fast temperature increase rates, however, steel's heating transformation temperature varies. Calculating a diffusion length requires the heating transformation temperature. Accordingly, the heating transformation temperature must be changed depending on the temperature increase rate.

As the temperature increase rate varies with the capacity of the power supply, the shape of induction coil and that of the object to be treated and the like, it is preferable to that the temperature increase rate be changed as appropriate by the type of equipment and that of the object. From the point where the temperature of portion 1b the temperature of which is measured by temperature measuring means 5 exceeds the heating transformation temperature, the diffusion length is integrated, as described above. When $D_{ep}$ at any time exceeds $D^*_{ep}$, cooling the object immediately starts. Desirably, the value of $D^*_{ep}$ is as small as possible in a range that can maintain desired qualities obtained through the heat treatment, from the viewpoint of reducing the time of the heat treatment. From the viewpoint of stability in quality, however, it is desirable that the value is a set value allowing for safety to some extent.

The first embodiment provides an induction heating treatment method including a temperature controlling step of adjusting in temperature an object to be treated, and a quench controlling step of determining when the object heated should be cooled. The temperature controlling step includes a heating step of heating the object through induction heating, a temperature measuring step involved in temperature control, of measuring the temperature of a portion of the object that is heated, and a temperature adjusting step of outputting a temperature control signal based on information of the measured temperature to control heating the object. The quench controlling step includes a temperature measuring step involved in quenching, of measuring the temperature of a portion located away from the heated portion of the object, and a heat treatment adjusting step of adjusting a heating time based on the information of the measured temperature, and outputting a cooling start signal.

The induction heating treatment method and equipment in the first embodiment can measure the temperature of an object to be treated and feed a result of the measurement back to a condition for heating the object and when the object being quenched should be cooled, while induction heating the object with controlled temperature so that the method and equipment can be applied to an object to be treated having any geometry and also produce an induction heated and thus treated product having a desired quality obtained through a heat treatment. Furthermore, if a diagram representing a relationship between the quenching temperature and the holding time allowing the heat treatment to provide a product with satisfactory qualities, or a TTA diagram, can be prepared for various types of materials for the object to be treated, a condition can be determined according to the diagram. Hence, the induction heating treatment method of the present embodiment can be used irrespective of the type(s) of the material(s) forming the object to be treated. Furthermore the present method is a significantly general method that can be used irrespective of the geometry of the coil, the frequency of the power supply and the geometry of the sample piece.

Second Embodiment

A second embodiment of the present invention will be described hereinafter. The second embodiment provides induction heating treatment equipment, an induction heating treatment method and an induction heated and thus treated product basically similar in configuration to that of the first embodiment. In the second embodiment, however, the heat treatment adjusting means performs the heat treatment adjusting step with the temperature at which the calculation of diffusion length $D_{ep}$ of carbon starts, i.e., a heating transformation temperature Tc, determined as described hereinafter.

Figure 4:
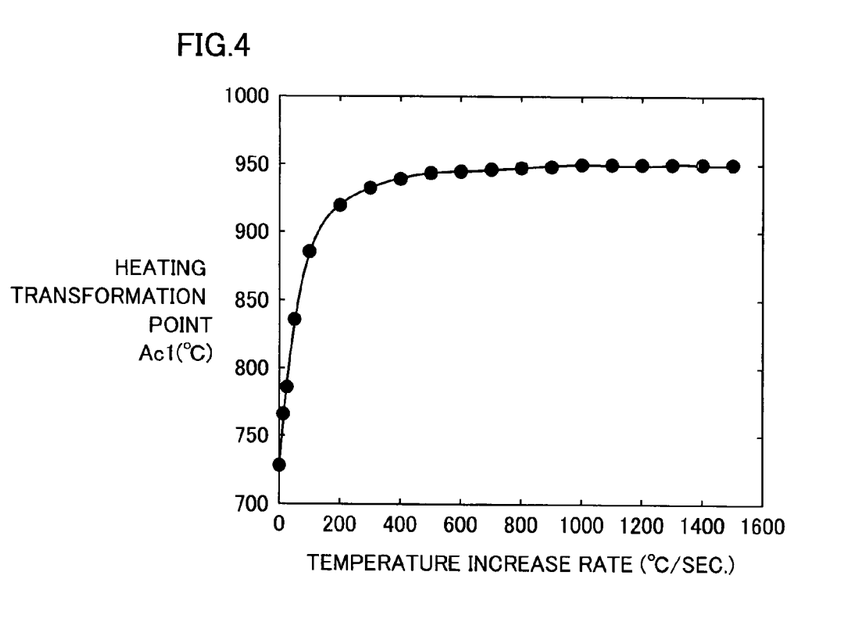
FIG. 4 shows a relationship between a temperature increase rate and a heating transformation point for a steel containing 1 mass % of carbon.

More specifically, with reference to FIG. 4, it can be seen that as the temperature increase rate changes, heating transformation point Tc changes from 727° C. to 950° C. Accordingly, a relationship between the temperature increase rate and heating transformation point Tc is previously obtained for the composition of the steel configuring object 1 and heating transformation point Tc is obtained from the temperature increase rate in heating object 1, and from the heating transformation point Tc obtained, a temperature at which the calculation of diffusion length $D_{ep}$ of carbon is started is determined.

Figure 5:
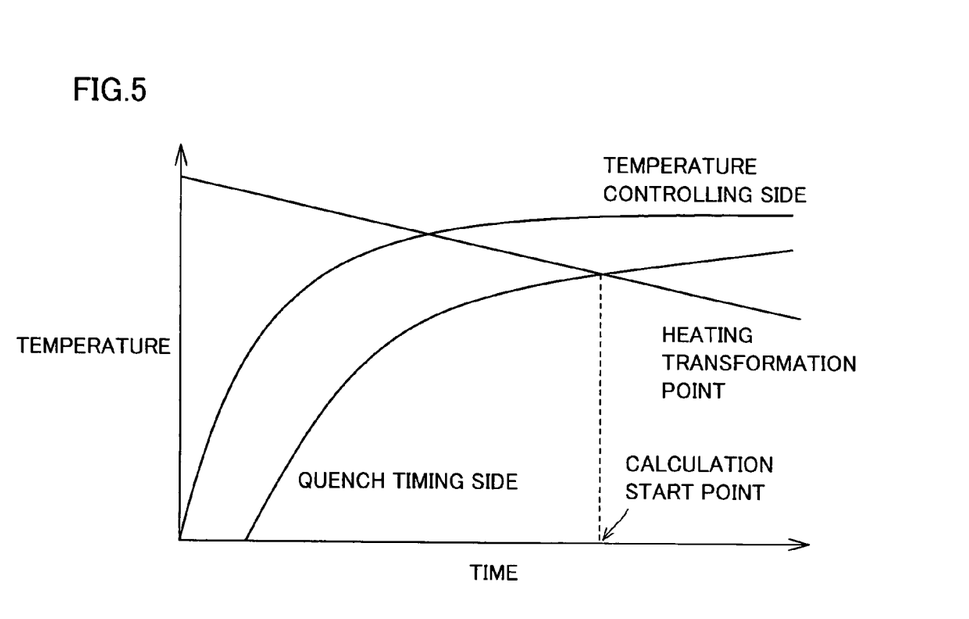
FIG. 5 schematically shows a method for determining a temperature for starting a calculation of a diffusion length of carbon with the temperature increase rate considered.

Reference will be made to FIG. 5 to describe a method taking the temperature increase rate into consideration in determining the temperature at which the calculation of the diffusion length of carbon is started. FIG. 5 shows a heat pattern of the temperature controlling side (portion 1a the temperature of which is measured by temperature measuring means 3 in FIG. 1), a heat pattern of the quench controlling side (portion 1b the temperature of which is measured by temperature measuring means 5 in FIG. 1), and heating transformation point Tc. In an initial stage of heating the object, the temperature controlling side is heated rapidly, and the quench timing side also increases in temperature rapidly. Accordingly, the heating transformation point becomes high. When the temperature controlling side approaches a desired temperature, temperature adjusting means 4 controls heating the object to allow the temperature controlling side to increase in temperature gently. Accordingly the quench controlling side also increases in temperature gently, and heating transformation point Tc decreases. Accordingly, as time elapses, heating transformation point Tc crosses the heat pattern of quench timing side. This intersection represents a temperature at which austenitization starts. Accordingly the calculation of diffusion length $D_{ep}$ of carbon is started from the temperature of the intersection (that is, the temperature at which austenitization starts).

Then when $D_{ep\ n}$ at any time exceeds $D^*_{ep}$, cooling the object is immediately started. Desirably, the value of $D^*_{ep}$ is as small as possible in a range that can maintain desired qualities obtained through the heat treatment, from the viewpoint of reducing the time of the heat treatment. From the viewpoint of stability in quality, however, it is desirable that the value is a set value allowing for safety to some extent.

Figure 6:
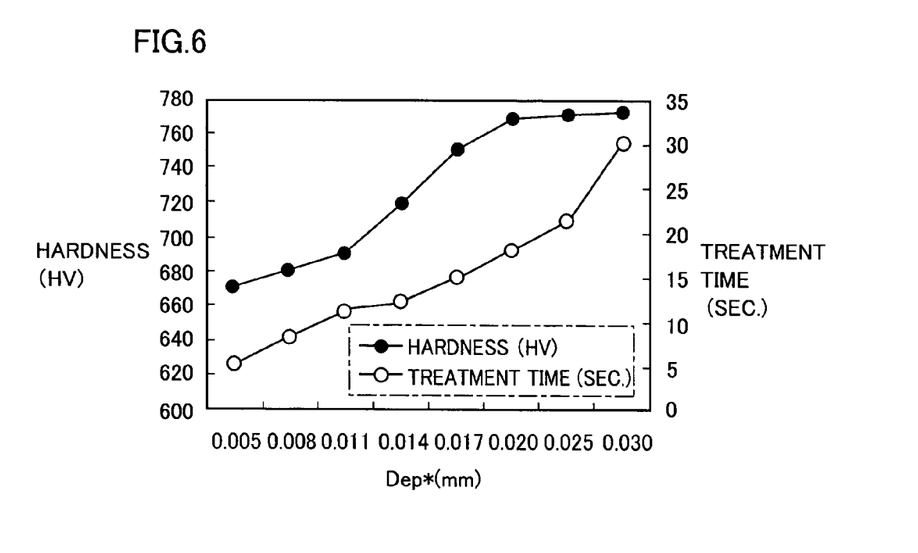
FIG. 6 shows a relationship between a value of $D^*_{ep}$, and hardness and treatment time.

Reference will be made to FIG. 6 to describe a relationship between the value of $D^*_{ep}$, and hardness and treatment time. It is noted that FIG. 6 shows the relationship with the following condition: maximum temperature attained: 900° C., temperature decrease rate: 0° C./second, and a post-quench tempering condition: 180° C.×120 min. From FIG. 6, it can be seen that the treatment time increases as greater $D^*_{ep}$ is set, since the required diffusion length increases, and that the hardness increases as greater $D^*_{ep}$ is set, since the treatment time increases. Note that for hardness, heating for an excessively long period of time provides saturation, and a maximum hardness is reached for a $D^*_{ep}$ of about 0.02 mm. Therefore, the value of $D^*_{ep}$ of at most 0.02 mm would be desirable.

Note that as the value that the temperature increase rate can assume varies with the capacity of the power supply, the shape of induction coil and that of the object to be treated and the like, it is preferable that the temperature increase rate be changed as appropriate by the type of equipment and that of the object.

In the second embodiment, a previously obtained, temperature increase rate-heating transformation point relationship is used to obtain a heating transformation point from a temperature increase rate, and from the obtained heating transformation point, a temperature at which calculating a diffusion length of carbon is started is determined. This can address variation in the temperature at which austenitization starts in rapidly heating an object. Consequently the induction heating treatment method and equipment in the second embodiment can obtain the diffusion length of carbon more accurately and thus provide an induction heated and thus treated product stabilized in quality.

Third Embodiment

A third embodiment of the present invention will be described hereinafter. The third embodiment provides induction heating treatment equipment, an induction heating treatment method and an induction heated and thus treated product basically similar in configuration to that of the first embodiment. In the third embodiment, however, the heat treatment adjusting means performs the heat treatment adjusting step such that in determining when to cool an object, whether the heat pattern of portion 1b the temperature of which is measured by temperature measuring means 5 falls within the standards in the TTA diagram is determined by employing the following expressions (3) and (2):

$$D_{ep} = A \times 2(Dt)^{1/2} \qquad \text{expression (3)}$$

where D: diffusion constant, t: holding time (second), A: correction coefficient;

$$D = D_0 \exp(-Q/RT) \qquad \text{expression (2)}$$

where $D_0$: entropy term of diffusion constant, Q: activation energy, R: gas constant, T: absolute temperature (K); and wherein correction coefficient A is a value obtained from the following expression (4):

$$\mathrm{erf}(A) = 1 - 0.1573 C_1/C_2 \qquad \text{expression (4)}$$

where $C_1$: solid solubility of carbon at 727° C. (0.52 for SUJ2), $C_2$: solid solubility of carbon at arbitrary temperature.

Expression (3) calculates diffusion length $D_{ep}$ of carbon when $C_1$ in expression (4) is replaced by $C_2$. The value of $C_2$ is solid solubility of carbon at any temperature. These values can be determined in advance empirically or from thermodynamic equilibrium calculation. It is assumed that in quenching the object, the object is cooled when $D_{ep}$ in the expression reaches a value ($D^*_{ep}$).

With reference to FIG. 3 a method of integrating the value of $D_{ep}$ from a heat pattern will be described. Portion 1b, or the quench timing side, the temperature of which is measured to determine when to cool the object varies in temperature from time to time. Accordingly, the value of $D_{ep}$ is preferably integrated such that $D_{ep1} \to D_{ep2} \to \ldots \to D_{epn}$. As object 1 is increased in temperature, portion 1b the temperature of which is measured by temperature measuring means 5 increases in temperature more slowly than portion 1a, or the temperature controlling side, the temperature of which is measured by temperature measuring means 3, since less magnetic flux enters the former than the latter. Normally, if 727° C. is exceeded, iron starts to be austenitized. For fast temperature increase rates, however, iron's heating transformation temperature varies. Calculating a diffusion length requires the heating transformation temperature. The heating transformation temperature must be changed depending on the temperature increase rate.

From a point where the quench timing side exceeds the heating transformation temperature, diffusion length $D_{ep}$ is integrated, as described above. When $D_{ep\ n}$ at any time exceeds $D^*_{ep}$, cooling the object immediately starts. Desirably, the value of $D^*_{ep}$ is as small as possible in a range that can maintain desired qualities obtained through the heat treatment, from the viewpoint of reducing the time of the heat treatment. From the viewpoint of stability in quality, however, it is desirable that the value be a set value allowing for safety to some extent.

Figure 7:
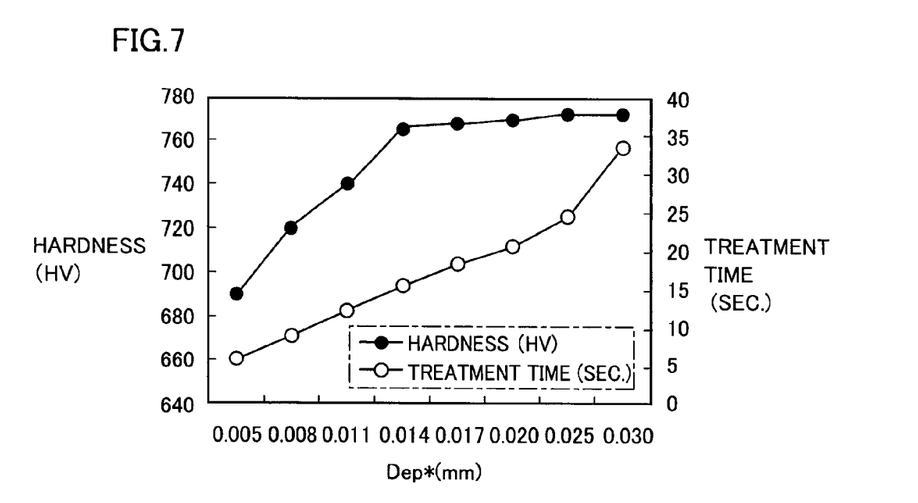
FIG. 7 shows a relationship between the value of $D^*_{ep}$, and hardness and treatment time.
Figure 8:
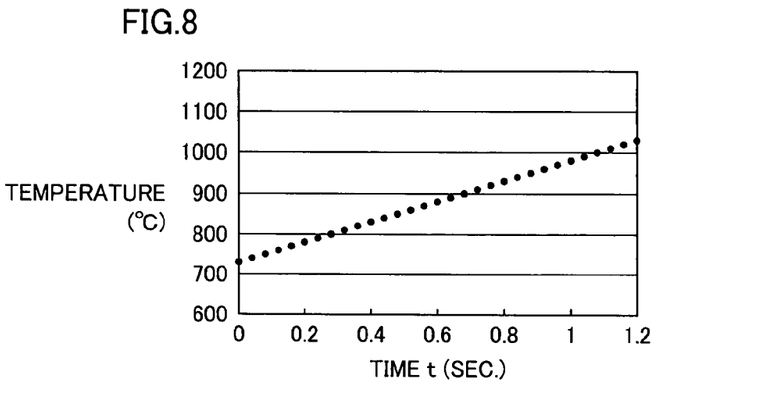
FIG. 8 shows a heat pattern of an object treated.

Reference will be made to FIG. 7 to describe a relationship between the value of $D^*_{ep}$, and hardness and treatment time. It is noted that FIG. 7 shows the relationship with the following condition: maximum temperature attained: 900° C., temperature decrease rate: 0° C./second, and a post-quench tempering condition: 180° C.×120 min. From FIG. 7, it can be seen that the treatment time increases as greater $D^*_{ep}$ is set, since the required diffusion length increases, and that the hardness increases as greater $D^*_{ep}$ is set, since the treatment time increases. Note that for hardness, heating for an excessively long period of time provides saturation, and a maximum hardness is reached for a $D^*_{ep}$ of about 0.015 mm. Therefore, the value of $D^*_{ep}$ of at most 0.015 mm would be desirable.

In the third embodiment diffusion length $D_{ep}$ of carbon is obtained through an expression employing correction coefficient A to consider solid solubility $C_2$ of carbon at any temperature to allow for carbon concentration varying with temperature. Thus if the quench timing side varies in temperature from time to time, diffusion length $D_{ep}$ of carbon can be obtained accurately. Consequently the induction heating treatment method and equipment of the third embodiment can more timely start cooling an object in quenching it and thus provide an induction heated and thus treated product stabilized in quality.

Fourth Embodiment

A fourth embodiment of the present invention will be described hereinafter. The fourth embodiment provides induction heating treatment equipment, an induction heating treatment method and an induction heated and thus treated product basically similar in configuration to that of the first embodiment. In the fourth embodiment, however, the heat treatment adjusting means performs the heat treatment adjusting step such that in determining when to cool an object, whether the heat pattern of portion 1b the temperature of which is measured by temperature measuring means 5 falls within the standards in the TTA diagram is determined by employing an expression (5) (Fick's second law) and expression (2) as follows:

$$\partial C/(\partial t) = D \partial^2 C/(\partial x^2) \quad \text{expression (5)}$$

D: diffusion constant, C: carbon concentration (mass %), t: time (second), x: distance $$D = D_0 \exp(-Q/RT) \quad \text{expression (2)}$$

$D_0$: entropy term of diffusion constant, Q: activation energy, R: gas constant, T: absolute temperature (K).

If expression (5) is expressed in a difference equation it is expressed as follows:

$$C_{m,n+1} = rC_{m+1,n} + (1-2r)C_{m,n} + rC_{m-1,n} \quad \text{expression (6)}$$

$$r = D \times \Delta t/(\Delta x)^2 \quad \text{expression (7)}.$$

When the object should be cooled is determined by solving expression (6) with a boundary condition to see whether the solid solution state of carbon in the material satisfies a prescribed condition. The boundary condition is provided by defining carbon's solid solubility by a carbon concentration of two points of one dimension (hereinafter referred to as a "boundary point"). This is a model for approximately determining diffusion of carbon from two carbides in steel.

Reference will now be made to FIGS. 8-11 to describe an example of calculating a solid solution state of carbon in the materials forming an object to be treated. In calculating the solid solution state of carbon, the distance between two boundary points (the distance between carbides) was defined as 0.012 mm, and the value of C at boundary points (the value of carbon concentration (mass %)) was defined as the value of a solid solubility curve of SUJ2 (as calculated using thermodynamic equilibrium calculation software). The expression of the solid solubility curve (or solid solubility) can be determined in advance for each material, either empirically or by thermodynamic equilibrium calculation.

From FIGS. 8-11, it can be seen that the distribution of the solute carbon concentration changes as time elapses. In the method according to the fourth embodiment, when to start cooling the object is determined based on whether the carbon-concentration at the center position in the distribution of the solute carbon concentration (i.e., a position at 0.006 mm if the distance between the two boundary points (or carbides) is 0.012 mm) reaches a prescribed carbon concentration. Additionally, it is desirable that the value of the carbon concentration at the center position for determining when to start cooling the object be set at 0.6 to 0.8 mass % to allow for the balance between hardness and the quantity of retained austenite. Further, it is desirable that the distance between the two boundary points (or carbides) be changed as appropriate depending on the microstructure of the object before it is quenched, its variation in material, and the like.

Figure 9:
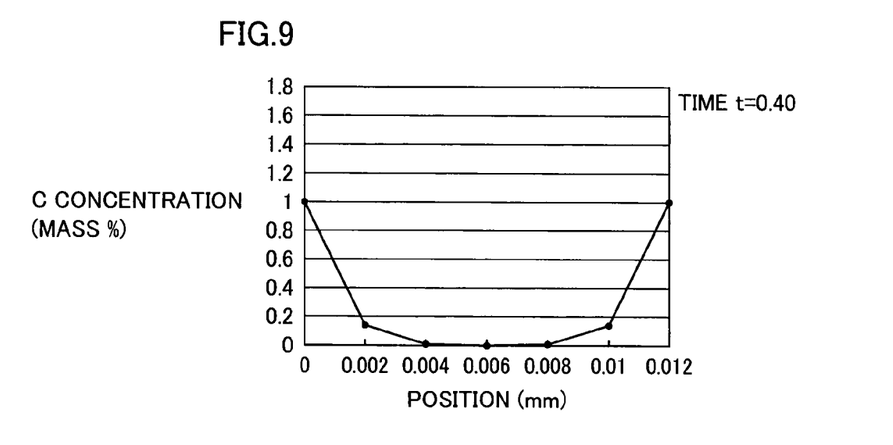
FIG. 9 shows a distribution of carbon (a distribution of solute carbon concentration) at each position between two boundary points when a time t shown in FIG. 8 is 0.4 second.
Figure 10:
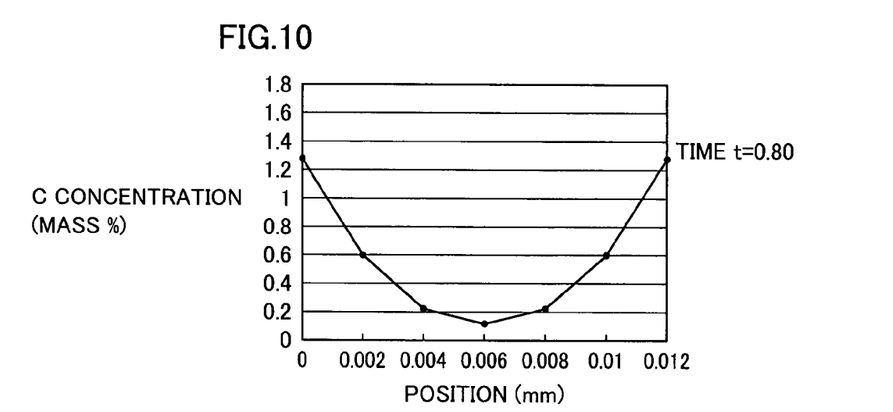
FIG. 10 shows a distribution of carbon (a distribution of solute carbon concentration) at each position between two boundary points when time t shown in FIG. 8 is 0.8 second.
Figure 11:
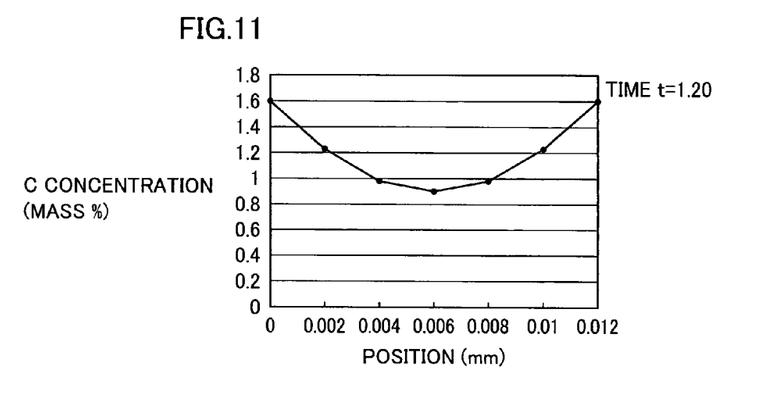
FIG. 11 shows a distribution of carbon (a distribution of solute carbon concentration) at each position between two boundary points when time t shown in FIG. 8 is 1.2 second.

Specifically in the fourth embodiment when to start cooling the object is determined, for example as follows: First, the temperature on the quench timing side is measured by temperature measuring means 5 (step A), and from the measured temperature, the carbon quantity in the boundary portion is calculated (step B). The value of carbon quantity in the boundary portion is assigned to the boundary condition of expression (6) to solve expression (6) (step C). By the foregoing steps, the distribution of the solute carbon concentration as shown in FIGS. 9-11 can be calculated (step D). From the obtained distribution of solute carbon concentration, whether the carbon concentration at the center position in the distribution of the solute carbon concentration reaches a prescribed carbon concentration (of 0.6-0.8 mass % for example) is confirmed (step E). If the carbon concentration at the center position reaches the prescribed carbon concentration, cooling the object is started (step F). Otherwise, cooling the object is not started and heating the object is continued, and the process goes back to step A again.

Expression (6) in step C is solved specifically as follows. First, the carbon concentration at opposing ends of the carbon distribution in FIGS. 9-11 is a carbon concentration of a carbide-matrix interface. Accordingly, from this position, carbon is supplied to the matrix at a certain concentration (or carbon's solid solubility limit). In order to provide expression (6) with this condition, it is necessary to substitute a concentration (or carbon's solid solubility limit) into the value of $C_{0,n}$ and $C_{m,n}$ (the positions of 0 mm and 0.012 mm in FIGS. 9-11).

In this calculation method, referred to as differential method, if the distance is divided by five points (seven points if the boundary points are included) as shown in FIGS. 9-11, five simultaneous equations are obtained, wherein unknowns are seven, namely, $C_{0,n}$, $C_{1,n}$, $C_{2,n}$, $C_{3,n}$, $C_{4,n}$, $C_{5,n}$, and $C_{6,n}$. Among them, $C_{0,n}$ and $C_{6,n}$ are the positions of the carbide-matrix interface, and a value of carbon concentration can be provided from an expression of solid solubility. Thus there are five simultaneous equations and five unknowns, and $C_{1,n}$, $C_{2,n}$, $C_{3,n}$, $C_{4,n}$ and $C_{5,n}$ can be obtained.

Specifically, expression (6) cannot be solved unless the condition of the carbon concentration at two points is provided. Accordingly, by providing the condition of the carbon concentration at the two points from an expression of solid solubility, expression (6) can be solved.

Figure 12:
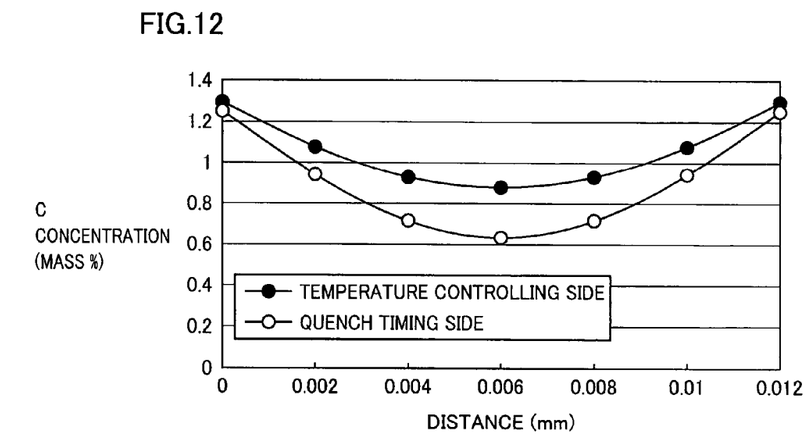
FIG. 12 shows a distribution of solute carbon concentration on a temperature controlling side (a portion 1a the temperature of which is measured by temperature measuring means 3 involved in temperature control, as shown in FIG. 1) and a quench timing side (a portion 1b the temperature of which is measured by temperature measuring means 5 involved in quenching, shown in FIG. 1), as obtained when cooling an object starts, in quenching the object by a method described in a fourth embodiment.

The calculation of solute carbon concentration as described above is performed not only on the quench timing side but also on the temperature controlling side. This is done in order to estimate a quantity of retained austenite on the temperature controlling side from the solid solution state of carbon on the temperature controlling side. As shown in FIG. 12, the temperature controlling side is generally higher in solute carbon concentration than the quench timing side. This is because the temperature of object 1 on the temperature controlling side close to heating means 2 is higher than on the quench timing side. Note that the data of FIG. 12 is obtained when the quenching temperature is constant at 950° C., the temperature increase rate before the quenching temperature is attained is 300° C./sec, the distance between carbides is 0.012 μm, and a cooling condition is a carbon concentration of 0.6 mass % at the center position.

The temperature at which the calculation of solute carbon concentration aforementioned is started must be determined with the temperature increase rate considered for both the quench timing side and the temperature controlling side. This can be done similarly as described in the second embodiment with reference to FIGS. 4 and 5.

Heating the object is started to quench it and thereafter once the carbon concentration at the center position in the distribution of solute carbon concentration described with reference to FIGS. 8-11 exceeds a prescribed carbon concentration (for example of 0.6-0.8 mass %), cooling the object immediately starts.

In the fourth embodiment the induction heating treatment method and equipment can obtain diffusion of carbon from carbide in an object to be treated. Thus it allows an amount of solute carbon to be estimated correctly. Thus the object can be cooled in quenching after the condition of the amount of solute carbon is satisfied. Furthermore the amount of solute carbon can be estimated not only at the quench timing side but also the temperature controlling side to also estimate from the amount of solute carbon a quantity of retained austenite on the temperature controlling side. Consequently the fourth embodiment provides an induction heated and thus treated product stabilized in quality.

FIRST EXAMPLE

Hereinafter a first example of the present invention will be described. The induction heating treatment equipment shown in FIG. 1 was employed to utilize induction heating to perform a through hardening treatment. The present equipment comprises temperature controlling means and quenching means. The temperature controlling means includes an induction coil serving as heating means 2 heating object 1 through induction heating, a radiation thermometer serving as temperature measuring means 3 measuring the temperature of portion 1a of object 1 that is heated by heating means 2, and temperature adjusting means 4 connected to the radiation thermometer and outputting a temperature control signal to heating means 2, as based on temperature information provided from the radiation thermometer.

The quenching means includes a the radiation thermometer serving as temperature measuring means 5 that is involved in quenching and measures the temperature of portion 1b of object 1 that is located away from portion 1a heated by heating means 2, and heat treatment adjusting means 6 connected to the radiation thermometer and adjusting a heating time, as based on temperature information provided from the radiation thermometer, and outputting a cooling start signal.

Temperature measuring means 3 measured the temperature of portion 1a located at a position at which the largest amount of magnetic flux entered and the largest elevation in temperature was observed. In contrast, temperature measuring means 5 measured the temperature of portion 1b located at a position farthest from portion 1a. Accordingly at portion 1b the smallest amount of magnetic flax entered and an elevation in temperature smaller than that of portion 1a the temperature of which was measured by temperature measuring means 3 was observed.

Figure 13:
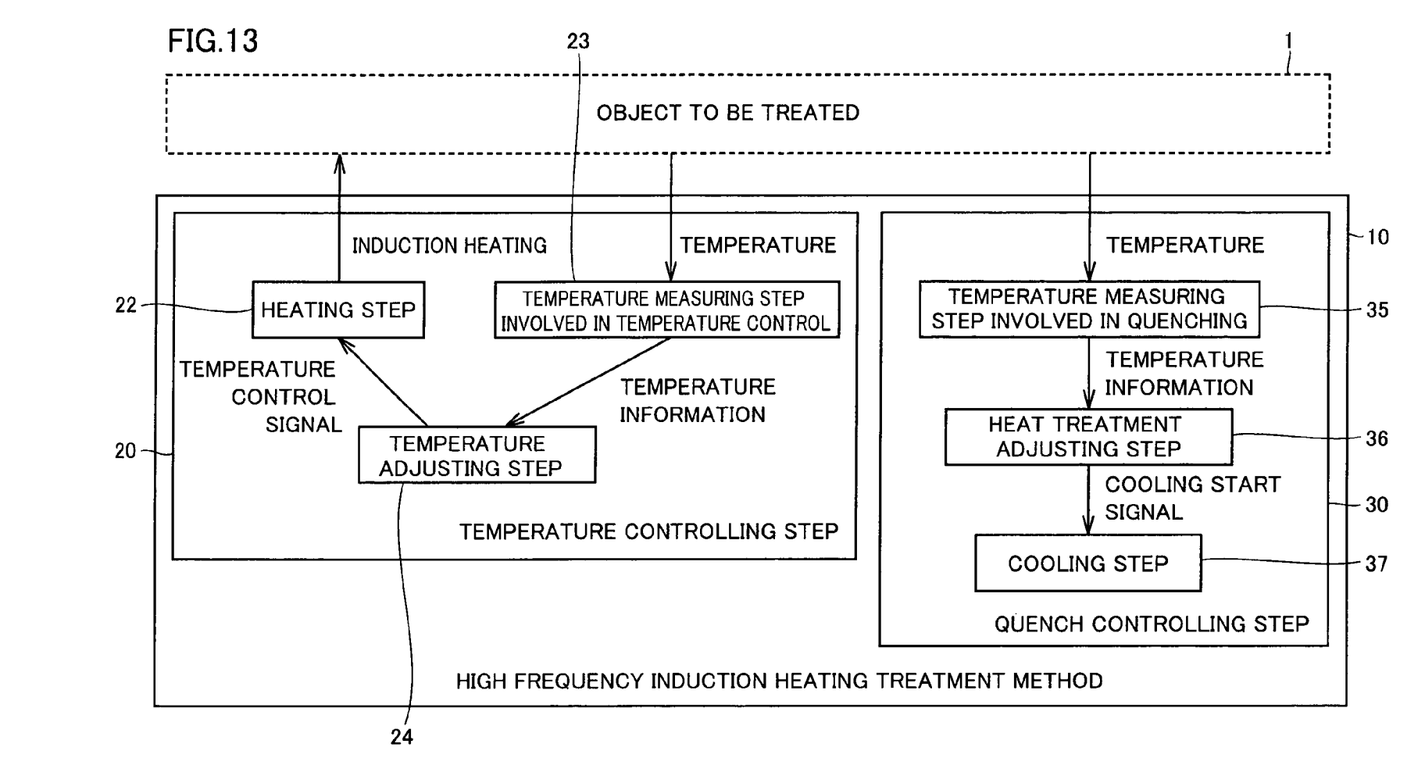
FIG. 13 schematically shows an induction heating treatment method in the first example.

With reference to FIG. 13, the first example provides an induction heating treatment method as will be outlined hereinafter. As shown in FIG. 13, the first example provides an induction heating treatment method 10 employing induction heating to heat object 1 to quench and thus harden object 1. The method includes a temperature controlling step 20 of adjusting object 1 in temperature, and a quench controlling step 30 of determining when object 1 heated should be cooled. Temperature controlling step 20 includes a heating step 22 of heating object 1 through induction heating, a temperature measuring step 23 involved in temperature control, of measuring the temperature of a portion of object 1 that is heated to output temperature information, and a temperature adjusting step 24 of receiving the temperature information output as based on information of the measured temperature, and outputting a temperature control signal to control heating object 1. Quench controlling step 30 includes a temperature measuring step 35 involved in quenching, of measuring the temperature of a portion of object 1 that is located away from the heated portion of the object, a heat treatment adjusting step 36 receiving temperature information output as based on information of the measured temperature, adjusting a heating time, and outputting a cooling start signal, and a cooling step 37 of receiving the cooling start signal in heat treatment adjusting step 36 to cool object 1 to the temperature of the Ms point or lower.

In the first example an outer ring of a bearing of JIS 6206 type made of SUJ2 was used as the object to be treated. The outer ring serving as the object made of SUJ2 had standard values set, for being temped at 180° C., at HRC 58 or larger for hardness and 12% or smaller for the quantity of retained austenite. Satisfying this standard requires a quenching temperature and a holding time having a relationship, as shown in FIG. 2.

To utilize an advantage of induction heating treatment, i.e., that it is capable of treatment in a short period of time, the object was quenched from 950° C. Accordingly, to ensure that a heat treatment provides a product with quality, the object is held in the heat treatment for 20 to 60 seconds, as seen from FIG. 2. A determined heat treatment condition was input to a personal computer and PID control was employed to control the temperature of portion 1a the temperature of which was measured by temperature measuring means 3. Simultaneously, temperature measurement data of temperature measuring means 5 was taken into the personal computer to determine when the object should be cooled, and output a cooling start signal to quench the object.

After the object was quenched, the object was measured for the quantity of retained austenite, and hardness. Heat treatment conditions and a measurement result are shown in Table 1. Of the heat treatment conditions indicated in Table 1, "maximum temperature" indicates the maximum temperature of portion 1b as measured by temperature measuring means 5. Furthermore "treatment time" is a time for which the heat treatment was continued after the maximum temperature was attained, and the temperature decrease rate in that time is also indicated. Induction heated and thus treated products obtained through heat treatment in the first example all satisfied the aforementioned standard obtained through heat treatment. Note that Table 1 indicates hardness variation, which represents a difference in hardness between portion 1a the temperature of which was measured and portion 1b the temperature of which was measured.

TABLE 1

| heat treatment condition | | | quantity of retained austenite at a portion located at a depth of 0.05 mm from inner peripheral surface (volume %) | hardness {variation} (HV) |
|---|---|---|---|---|
| maximum temperature attained (° C.) | treatment time (sec.) | temperature decrease rate (° C./sec.) | | |
| 950 | 6.35 | 0 | 11.9 | 772-798 {26} |
|  | 6.79 | 7 | 8.1 | 733-780 {47} |
|  | 8.22 | 15 | 6.3 | 722-783 {61} |

SECOND EXAMPLE

A second example of the present invention will be described hereinafter. The induction heating treatment equipment shown in FIG. 1 was employed and an outer ring of 6206 type made of SUJ2 was used as an object to be treated. Induction quenching was employed to conduct a through hardening treatment. The object was quenched from 900° C., and until that temperature was attained, temperature increase at rates of 10° C./second, 100° C./second, and 500° C./second were applied. A determined heat treatment condition was input into a personal computer and PID control was employed to control the temperature of portion 1a the temperature of which was measured by temperature measuring means 3. Simultaneously, temperature measurement data of temperature measuring means 5 was taken into the personal computer to determine when the object should be cooled, and output a cooling start signal to quench the object. After the object was quenched the object was held at 180° C. for 120 minutes and thus tempered.

In controlling the through hardening treatment employing induction quenching, expressions (1) and (2) were calculated. Furthermore, to determine a temperature at which calculating diffusion length $D_{ep}$ of carbon as indicated by expression (1) should be started, the method of the present example considering the temperature increase rate, as has been described with reference to FIGS. 4 and 5, and a method of a comparative example which started the calculation of diffusion length $D_{ep}$ of carbon at 727° C. and did not consider the temperature increase rate were compared to examine the quench timing side in hardness (Vickers hardness) after the object was quenched, as shown in Table 2. The value of $D^*_{ep}$ at the time was 0.02 mm, a condition allowing a maximum hardness (approximately HV 760).

TABLE 2

| method of calculation | heat treatment condition | | | hardness (HV) |
|---|---|---|---|---|
| | maximum temperature attained (° C.) | temperature increase rate until maximum temperature attained is attained (° C./sec.) | temperature decrease rate after maximum temperature attained is attained (° C./sec.) | |
| method of the present example | 900 | 10 | 0 | 735 |
|  |  | 100 |  | 740 |
|  |  | 500 |  | 742 |
| method of comparative example | 900 | 10 | 0 | 730 |
|  |  | 100 |  | 710 |
|  |  | 500 |  | 690 |

Of the heat treatment conditions of Table 2, "maximum temperature attained" is the maximum temperature of portion 1b as measured by temperature measuring means 5. Furthermore "temperature decrease rate" indicates a temperature decrease rate while the heat treatment continued after the maximum temperature was attained. Induction heated and thus treated products obtained through heat treatment in the method of the present example all satisfied the standard.

Table 2 shows that the present example considering the temperature increase rate allows the quench timing side to be larger in hardness than the comparative example that did not consider the temperature increase rate. This is because if the temperature increase rate is considered, the calculation of the diffusion length of carbon does not start until a temperature higher than 727° C. is attained, and as a result the object was held for a longer period of time to be uniformly heated than when the temperature increase rate was not considered.

Furthermore in the present example considering the temperature increase rate the quench timing side hardly varied in hardness despite that the temperature increase rate varied. In the comparative example that did not consider the temperature increase rate, in contrast, the quench timing side slightly varied in hardness. This is because without the temperature increase rate considered, an accurate diffusion length of carbon cannot be calculated.

In this experiment the present example considering the temperature increase rate and the comparative example that did not consider the temperature increase rate both allowed the quench timing side to have a sufficient value in hardness (of HRC 58 or higher). In view of accurately calculating a diffusion length of carbon, however, it is desirable that the temperature increase rate be considered.

THIRD EXAMPLE

A third example of the present invention will be described hereinafter. The induction heating treatment equipment shown in FIG. 1 was employed and an outer ring of 6206 type made of SUJ2 was used as an object to be treated. Induction quenching was employed to conduct a through hardening treatment. The object was quenched at 900° C., 930° C., 950° C., 980° C., 1000° C. A determined heat treatment condition was input into a personal computer and PID control was employed to control the temperature of portion 1a the temperature of which was measured by temperature measuring means 3. Simultaneously, temperature measurement data of temperature measuring means 5 was taken into the personal computer to determine when the object should be cooled, and output a cooling start signal to quench the object. After the object was quenched the object was held at 180° C. for 120 minutes and thus tempered.

In this induction quenching and thus through hardening treatment, when the object should be cooled was determined by employing a combination of expressions (3) and (2) and that of expressions (1) and (2), and the object thus quenched was examined for hardness (Vickers hardness) and the quantity of retained austenite, as indicated in Table 3. The $D^*_{ep}$ value at the time was 0.015 mm, a condition allowing a maximum in hardness (of approximately HV760).

TABLE 3

| expression used to determine when to cool | heat treatment condition | | hardness (HV) | hardness variation (HV) | quantity of retained austenite (volume %) | variation in quantity of retained austenite (volume %) |
|---|---|---|---|---|---|---|
| | maximum temperature attained (° C.) | temperature decrease rate (° C./sec.) | | | | |
| expressions (3) & (1) | 900 | 0 | 752 | 25 | 6.3 | 1.3 |
| | 930 | | 760 | | 6.8 | |
| | 950 | | 766 | | 6.8 | |
| | 980 | | 766 | | 7.4 | |
| | 1000 | | 777 | | 7.6 | |
| expressions (1) & (2) | 900 | 0 | 698 | 77 | 2.5 | 6.5 |
| | 930 | | 720 | | 3 | |
| | 950 | | 723 | | 3.8 | |
| | 980 | | 750 | | 6 | |
| | 1000 | | 775 | | 9 | |

Of the heat treatment conditions of Table 3, "maximum temperature attained" is the maximum temperature of portion 1b as measured by temperature measuring means 5. Futhermore "temperature decrease rate" indicates a temperature decrease rate while the heat treatment continued after the maximum temperature was attained. Furthermore, "hardness variation" indicates a difference between largest and smallest values in hardness of protion 1b, as provided when the maximum temperature attained was changed from 900° C. to 1,000° C. Furthermore, "variation in quantity of retained austenite" indicates a difference between largest and smallest values in the quantity of retained austenite in portion 1b, as provided when the maximum temperature attained was changed from 900° C. to 1,000° C. Any of the ways provided an induction heated and thus treated product satisfying the standard.

However, it can be seen from Table 3 that when expressions (1) and (2) were used the quench timing side exhibited a slightly large variation in quality for different heat treatment conditions, whereas when expressions (3) and (2) were used the quench timing side has variation in quality in a reduced amount. It can be seen that expressions (3) and (2) can provide an accurate diffusion length of carbon if the quench timing side varies in temperature from time to time.

FOURTH EXAMPLE

A fourth example of the present invention will be described hereinafter. The induction heating treatment equipment shown in FIG. 1 was employed and an outer ring of 6206 type made of SUJ2 was used as an object to be treated. Induction quenching was employed to conduct a through hardening treatment. The object was quenched at 900° C., 930° C., 950° C., 980° C., 1000° C. A determined heat treatment condition was input into a personal computer and PID control was employed to control the temperature of portion 1a the temperature of which was measured by temperature measuring means 3. Simultaneously, temperature measurement data of temperature measuring means 5 was taken into the personal computer, and from its heat pattern, whether the object was sufficiently heated was determined to determine when the object should be cooled, and output a cooling start signal to quench the object. After the object was quenched the object was held at 180° C. for 120 minutes and thus tempered.

In this quenching treatment, when the object should be cooled was determined by employing expressions (5) and (2). Furthermore a temperature at which calculating the solid solution state of carbon, as indicated by expression (5), should be started was determined considering the difference of temperature increase rate, as has been described in the second embodiment with reference to FIGS. 4 and 5.

An induction heated and thus quenched product thus obtained was examined for hardness (Vickers hardness) and the quantity of retained austenite at the temperature controlling side and the quench timing side, as indicated in FIG. 4. Of the heat treatment conditions of Table 4, "maximum temperature attained" is the maximum temperature of portion 1b as measured by temperature measuring means 5. Furthermore "temperature decrease rate" indicates a temperature decrease rate while the heat treatment continued after the maximum temperature was attained.

TABLE 4

| heat treatment condition | | hardness (HV) | | quantity of retained austenite (volume %) | |
|---|---|---|---|---|---|
| maximum temperature attained (° C.) | temperature decrease rate (° C./sec.) | temperature controlling side | quench timing side | temperature controlling side | quenching timing side |
| 900 | 0 | 760 | 732 | 11.2 | 7.8 |
| 930 | | 761 | 738 | 10.8 | 7.2 |
| 950 | | 758 | 730 | 11 | 7.5 |
| 980 | | 756 | 742 | 10 | 7.8 |
| 1000 | | 762 | 740 | 11.5 | 8.3 |

Table 4 shows a result indicating that all of the heat treatment conditions in the method of the present example (i.e., those of portion 1a the temperature of which was measured by temperature measuring means 3) satisfied the standard. Furthermore the quench timing side less varied in material and was stable in quality.

Furthermore, although it is not indicated in Table 4, an experiment was also conducted for a maximum temperature attained of 800° C., a temperature lower than an optimum quenching temperature for SUJ2. In this case after the maximum temperature attained was attained the object was continuously heated, and when five minutes thus elapsed, quenching the object was still not started. This is because a prescribed carbon concentration was not attained between two boundary points. Thus it has been confirmed that in the method of the present example if an amount of solute carbon having a sufficient value is not attained, quenching the object is not started, and a temperature at which quenching the object should be started can accurately be determined.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present high frequency induction heating treatment equipment and method is advantageously applicable particularly to high frequency induction heating treatment equipment and methods that employ induction heating to heat an object to be treated, and thus quench and harden the object. Furthermore the present induction heated and thus treated product is advantageously applicable particularly to induction heated and thus treated products that are induction heated and thus quenched and hardened.

The invention claimed is:

1. High frequency induction heating treatment equipment, comprising:
   temperature controlling means for adjusting an object in temperature, and;
   quenching determining means for determining when said object heated should be cooled, wherein:
   said temperature controlling means includes
      heating means heating said object through induction heating,
      first temperature measuring means involved in temperature control and measuring in temperature a portion of said object that is heated by said heating means, and
   temperature adjusting means connected to said first temperature measuring means to output a temperature control signal to said heating means, as based on information of temperature received from said first temperature measuring means; and
   said quenching determining means includes
      second temperature measuring means involved in quenching, and measuring in temperature a portion located away from said portion of said object that is heated by heating means, and
      heat treatment adjusting means connected to said second temperature measuring means to adjust a heating time, as based on temperature information received from said second temperature measuring means, and output a cooling start signal, wherein said heat treatment adjusting means is programmed to determine a diffusion length $D_{ep}$ of carbon by:

$$D_{ep}=A\times 2(Dt)^{1/2}$$

where D: a diffusion constant, t: a holding time (in seconds), A: a correction coefficient;

$$D=D_0\exp(-Q/RT)$$

where $D_0$: an entropy term of said diffusion constant, Q: activation energy, R: a gas constant, T: absolute temperature (K); and $$erf(A)=1-0.1573C_1/C_2$$

where $C_1$: a solid solubility of carbon at 727° C., $C_2$: a solid solubility of carbon at any temperature.

2. High frequency induction heating treatment equipment, comprising:
   temperature controlling means for adjusting an object in temperature, and;
   quenching determining means for determining when said object heated should be cooled, wherein:
   said temperature controlling means includes
      heating means heating said object through induction heating,
      first temperature measuring means involved in temperature control and measuring in temperature a portion of said object that is heated by said heating means, and
      temperature adjusting means connected to said first temperature measuring means to output a temperature control signal to said heating means, as based on information of temperature received from said first temperature measuring means; and
   said quenching determining means includes
      second temperature measuring means involved in quenching, and measuring in temperature a portion located away from said portion of said object that is heated by heating means, and
      heat treatment adjusting means connected to said second temperature measuring means to adjust a heating time, as based on temperature information received from said second temperature measuring means, and output a cooling start signal,
   wherein said heat treatment adjusting means is programmed to determine a solid solution state of carbon by:

$$\partial C/(\partial t)=D\partial^2 C/(\partial x^2)$$

where D: a diffusion constant, C: carbon concentration (mass %), t: time (in seconds), x: distance;

$$D=D_0\exp(-Q/RT)$$

where $D_0$: an entropy term of said diffusion constant, Q: activation energy, R: a gas constant, T: absolute temperature (K).

* * * * *